UNITED STATES PATENT OFFICE.

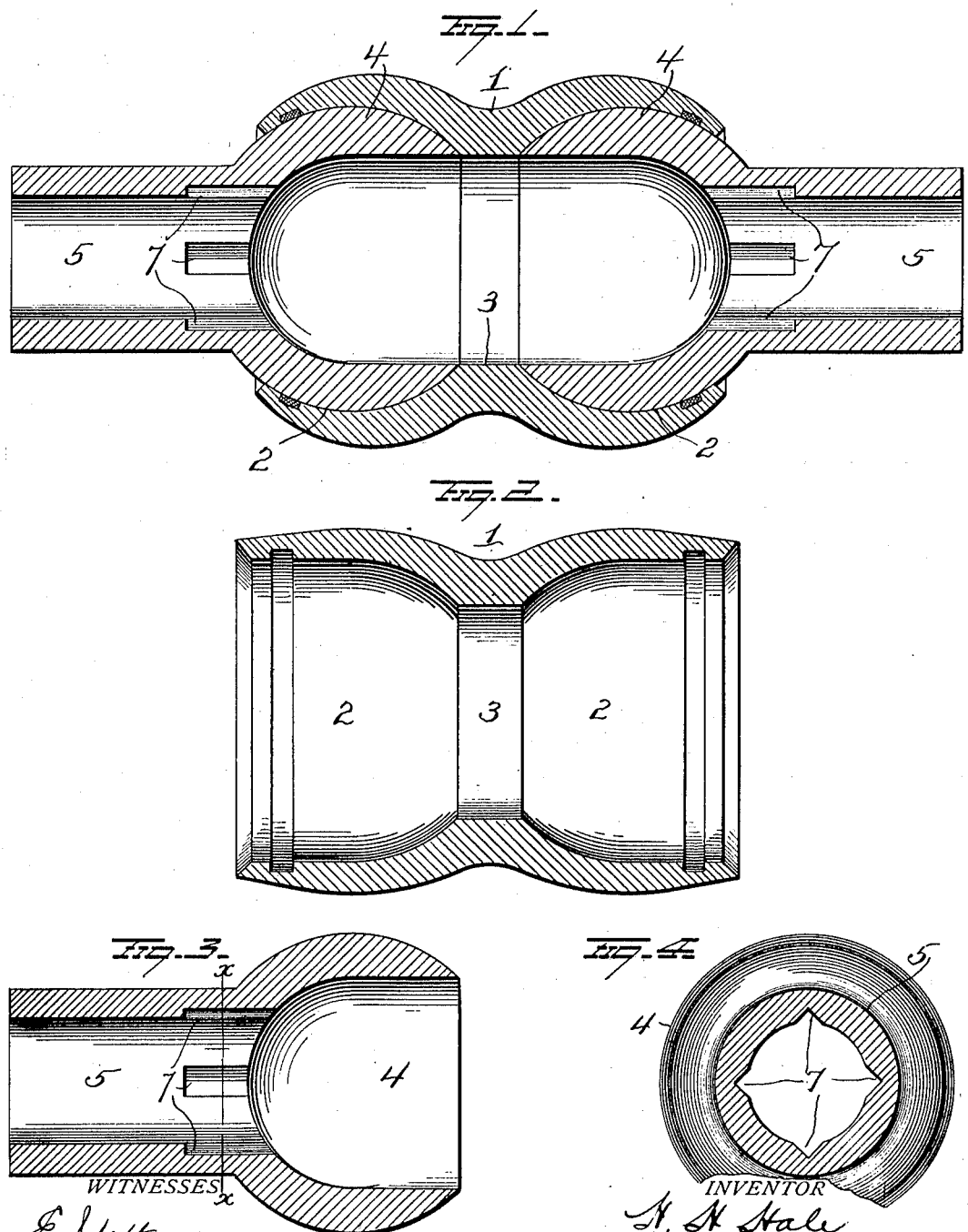

HARRY H. HALE, OF COLUMBUS, OHIO.

COUPLING FOR PIPES.

1,040,191.  Specification of Letters Patent.  Patented Oct. 1, 1912.

Application filed July 20, 1911. Serial No. 639,686.

*To all whom it may concern:*

Be it known that I, HARRY H. HALE, of Columbus, in the county of Franklin and State of Ohio, have invented certain new and useful Improvements in Couplings for Pipes; and I do hereby declare the following to be a full, clear, and exact description of the invention, such as will enable others skilled in the art to which it appertains to make and use the same.

This invention relates to improvements in couplings for pipes,—the object of the invention being to provide a simple and substantial coupling which shall permanently connect two pipe sections and at the same time, permit flexing of the connection.

With this object in view, the invention consists in certain novel features of construction and combinations of parts as hereinafter set forth and pointed out in the claims.

In the accompanying drawings, Figure 1 is a view in longitudinal section showing the assembled coupling; Fig. 2 is a longitudinal section showing the form of the coupling head before the pipe sections are connected therewith. Fig. 3 is a longitudinal section of a pipe section, and Fig. 4 is a transverse section on the line $x$—$x$ of Fig. 3.

1 represents a coupling head which consists of a malleable casting comprising two communicating sockets 2—2,—the walls of said sockets being curved toward the center of the casting, thus forming a contracted passage 3 connecting the sockets. The sockets of the coupling head receive hollow, partly spherical heads 4 of pipe sections 5, and the inner walls of the sockets 2 are provided near their outer ends with annular grooves for the reception of suitable packing rings 6 which bear against the outer faces of the partly spherical heads of the pipe sections.

While the head of each pipe section is made curved or partly spherical exteriorly, its interior is made approximately U-shaped in longitudinal section, and the opening in each head is the same in diameter at its inner end as that of the passage 3 in the center of the coupling.

At the juncture of each partly spherical head with its pipe section, several internal longitudinal grooves 7 are made,—each of said grooves being made V-shaped in cross section as shown in Fig. 4, so that the pipe section in proximity to its head will be angular in cross section in its interior.

The head 1 is made in such manner that the open outer ends of its sockets will be sufficiently large to permit the heads of the pipe sections to be freely inserted thereinto. After the pipe sections and coupling head shall have been assembled, with the heads 4 of the pipe sections in the sockets of the coupling head, the outer ends of the latter will be subjected to pressure to cause these portions to closely embrace the spherical outer faces of the heads of the pipe sections. Thus it will be seen that the heads of the pipe sections will be permanently connected with the coupling head by compression of the outer portions of the latter, and that while these connections are permanent, they are at the same time flexible ball-and-socket joints, and a pipe connection is produced which is simple, substantial, permanent and flexible.

Having fully described my invention what I claim as new and desire to secure by Letters-Patent, is:—

1. A pipe coupling comprising a coupling head consisting of two sockets joined by a relatively short and thick portion having a bore therethrough and two ball sections having bores adapted to be flush with the bore in the joining portion of the coupling head.

2. A pipe coupling consisting of a malleable cast iron coupling head formed in a single piece and provided with two sockets joined by a relatively short thickened bore portion, in combination, with two pipe sections each provided with a hollow head the exterior walls of which are curved to fit the curved interior walls of the coupling head, the outer ends of the coupling head being compressed over the hollow heads and securing the latter in place, said hollow heads having bores adapted to be flush with the bore of the joining portion of the coupling head.

3. A pipe coupling consisting of a malleable cast iron coupling head formed in a single piece and provided with two sockets joined by a relatively short thickened bored portion, each socket having interiorly curved walls, and a packing ring inserted near the outer end of the inner wall of each socket, in combination with two pipe sections, each provided with a hollow head, the exterior walls of which are curved to fit the curved interior walls of the coupling head, the outer ends of the coupling head being compressed over the hollow heads of the pipe sections and serving to secure the latter in place, said hollow heads having bores adapted to be flush with the bore of the joining portion of the coupling head.

In testimony whereof, I have signed this specification in the presence of two subscribing witnesses.

HARRY H. HALE.

Witnesses:
FRANK A. LIVINGSTON,
ALICE M. WILLIAMS.